United States Patent Office 3,000,884
Patented Sept. 19, 1961

3,000,884
14α-HYDROXY-18-OXYGENATED PREGNENES
Albert Wettstein and Ernst Vischer, Basel, and Charles Meystre, Arlesheim, Switzerland, assignors to Ciba Pharmaceutical Products Inc., Summit, N.J.
No Drawing. Filed Sept. 26, 1956, Ser. No. 612,112
Claims priority, application Switzerland Sept. 30, 1955
6 Claims. (Cl. 260—239.57)

This invention relates to the manufacture of $\Delta^4$-14α-hydroxypregnene compounds which are oxygenated in 18- or in 11- and 18-position, that is to say, which have in these positions free, esterified or etherified hydroxyl groups or free, acetalized, enolized or ketalized oxo groups; thus the 18-substituent may also be a free or functionally converted carboxyl group.

The new $\Delta^4$-14α-hydroxy-pregnenes which are hydroxylated in 21-position and their derivatives, as for example 14α-hydroxy-aldosterone, have a stronger mineral corticoid activity than desoxycorticosterone and therefore can be used therapeutically in those illnesses where desoxycorticosterone is indicated, e.g. in Addison's disease. The new $\Delta^4$-14α-hydroxy-pregnenes unsubstituted in 21-position can be used as intermediates for the production of the above mentioned therapeutically active compounds, into which they can be transformed for example if they are treated with oxidizing enzymes of Ophiobolus herpotrichus, for example according to the copending process of application Serial No. 518,922, filed June 29, 1955, by Albert Wettstein et al., now Patent No. 2,778,776.

The new $\Delta^4$-14α-hydroxy-pregnenes are obtained when 14-unsubstituted $\Delta^4$-pregnene compounds which are oxygenated in 18- or in 11- and 18-position, are subjected to the aerobic action of enzymes produced by fungi of the genera Mucor, Helicostylum, Pleospora or Curvularia.

The 14-unsubstituted-$\Delta^4$-pregnene compounds which are oxygeneated in 18- or in 11- and 18-position, used as starting materials, preferably contain in 3- and 20-position free or functionally converted hydroxyl or oxo groups. They can contain further double bonds, for example in 1-, 6-, 7-, 8-, 9:11-, 11:12- or 16-position, or may contain additional substituents, such as free or converted hydroxyl or oxo groups or also epoxy groups or halogen atoms, for example in 2-, 4-, 6-, 7-, 8-, 9-, 12-, 15-, 16-, 17- or 21-position, or methyl groups, for example in 17α-position. The above specified starting materials can be of any steric configuration and can also be used as racemates. They also comprise compounds of the so-called nor- and/or homo-series, especially 19-nor- and D-homo-compounds. Especially important starting materials are, for example, 18-hydroxy- and 18-oxo-progesterone, 17α:18-dihydroxy and 17α-hydroxy-18-oxo-progesterone, 18-hydroxy and 18-oxo-cortexone, 17α:18-dihydroxy and 17α-hydroxy-18-oxo-cortexone, aldosterone, 18-hydroxy-corticosterone and -11-dehydro-corticosterone, 11-epi-18-hydroxy- and 11-epi-18-oxo-corticosterone, 17α-hydroxy-aldosterine, 18-hydroxy-hydrocortisone, 18-hydroxy and 18-oxo-cortisone, corresponding 1-dehydro-and 21-oxo compounds and/or 9α-fluoro-, 9α-chloro- or 12α-fluoro- and 12α-chloro derivatives, for example 9α-fluoro-aldosterone and -1-dehydro-aldosterone, 9α-fluoro-18-hydroxy-corticosterone and -1-dehydro-corticosterone. In the starting materials, the functionally converted hydroxyl group is for example, a hydroxyl group esterified with an aliphatic, aromatic or heterocyclic carboxylic acid, for example acetic acid, propionic acid, benzoic acid or furane carboxylic acid, or an etherified carboxyl group, for example the tetrahydropyranyloxy-, benzyloxy- or triphenylmethoxy group. The functionally converted oxo group is advantageously a ketalized or acetalized oxo group, derived especially from a dihydric alcohol, such as the ethylene-dioxy group. As a functionally converted carboxyl group is to be understood primarily an esterified or lactonized carboxyl group.

The specified starting materials are caused to react according to the invention with enzymes produced by fungi of the genera Mucor, Helicostylum, Pleospora or Curvularia, especially of the species Pleospora gaeumanni, or also of the species Mucor griseo-cyanus, Mucor parasiticus, Helicostylum piriforme and Curvularia pallescens. For their culture the known media for this purpose are suitable, for example such as contain sugars, such as glucose or lactose, peptones, corn steep liquor, soya products and the like, or also mineral salts, or alternatively synthetic nutrient solutions. The operation is conducted especially under aerobic conditions, for example in a shaking culture, or with submerged growth with stirring and air supply. The specified fungi are distinguished from other micro-organisms, for example the bacteria, by good growth under relatively simple culture conditions. The reaction of the present process takes place in the described fungus culture or by means of the enzymes contained therein, if desired after concentration or separation, hence in the simplest case in a suspension of the separated fungus mycelium or of the homogenized fungus mycelium or in filtrates or aqueous extracts thereof.

The isolation of the products of the process can be carried out by methods known per se. Their separation can take place, for example, by extraction of the reaction mixture with an organic solvent, for example methylene chloride or ethyl acetate. For the further purification of the resulting extract there are especially suitable chromatography, for example on alumina or silica gel, application of distribution methods, for example, the countercurrent process, or separation by means of Girard reagents such as trimethylammonium or pyridinium acetic acid hydrazide. Subsequent to such purification or instead thereof it is finally preferable to recrystallize from organic or aqueous-organic solvents.

By the introduction of the 14-hydroxyl group valuable $\Delta^4$-14α-hydroxy-pregnenes and their derivatives are obtained, which are oxygenated in 18- or in 11- and 18-position, which, compared with the therapeutically active compounds which are not hydroxylated in 14-position, are distinguished by an increased activity. Among oxygenated compounds are understood such as contain free or functionally converted hydroxyl, oxo or acid groups, as for example esters, ethers, thioesters, thioethers, thiol and thione esters, acetals, mercaptals, ketals, enol derivatives, such as enol esters, enol ethers or enamines, hydrazones, semicarbazones and the like. Among the products of the process there may be mentioned especially 14α:18-dihydroxy and 14α-hydroxy-18-oxo-progesterone, 14α:17α:18-trihydroxy- and 14α:17α-dihydroxy-18-oxo-progesterone, 14α:18-dihydroxy- and 14α-hydroxy-18-oxo-cortexone, 14α:17α:18-trihydroxy- and 14α:17α-dihydroxy-18-oxo-cortexone, 14α-hydroxy-aldosterone, 14α:18-dihydroxy-corticosterone and -11-dehydro-corticosterone, 11-epi-14:18 - dihydroxy- and 11 - epi - 14α - hydroxy - 18-oxo - corticosterone, 14α:17α - dihydroxy - aldosterone, 14α:18-dihydroxy-hydrocortisone, 14α:18-dihydroxy- and 14α-hydroxy-18-oxo-cortisone, the corresponding 1-dehydro- and 21-oxo-compounds, also corresponding functional derivatives, such as esters, ethers, halogen derivatives, for example 9α- or 12α-halogen-, especially the fluoro- or chloro- compounds, for example 14α-hydroxy-9α-fluoro-aldosterone and -1-dehydro-aldosterone, 14α:18-dihydroxy-9α-fluoro-corticosterone and -1-dehydro-corticosterone. In so far as the products of the process do not possess the configuration and the substituents of therapeutically useful steroids, they can be used as intermediate products for the manufacture thereof, for example of the above specified compounds.

The reaction products obtainable according to the present process can be converted in the manner known per se into their functional derivatives, such as oxygen, sulfur or nitrogen derivatives, for example esters, ethers, enol esters, enol ethers, ketals, thioethers and thioketals or also hydrazones, oximes and enamines and moreover hydroxyl groups can be dehydrogenated to oxo groups. In these compounds, the hydroxyl and/or oxo groups can be wholly or partly functionally converted.

In the esters and enol esters the acid radicals are such of any organic or inorganic acids, such as aliphatic, alicyclic, araliphatic, aromatic or heterocyclic carboxylic, thiocarboxylic, thiol carboxylic or sulfonic acids, preferably of formic acid, acetic acid, chloracetic acids, trifluoracetic acid, propionic acid, butyric acids, valeric acids, trimethyl aetic acid, diethyl acetic acid, caproic acids, oenanthic acids, caprylic acids, palmitic acids, crotonic acid, undecanic acid, undecylenic acid, oxalic acid, succinic acid, pimelic acid, maleic acid, lactic acid, carbamic acids, alkoxy-carboxylic acids, β-cyclopentylpropionic acid, hexahydrobenzoic acid, benzoic acid, phenylacetic acid, cyclohexylacetic acid, phenylpropionic acids, trimethylgallic acid, phthalic acid, furane-2-carboxylic acid, isonicotinic acid, methane sulfonic acid, toluene sulfonic acid, sulfuric acids, hydrohalic acids or phosphoric acids.

If desired, in resulting compounds, functionally converted hydroxyl or oxo groups can be converted into free groups. In this manner in particular in polysubstituted derivatives, the functionally converted groups can also be liberated in part. This takes place, for example, by chemical or enzymatic hydrolysis, for example with the application of acid or basic agents, by re-esterification or re-acetalization. From the only partially converted, such as esterified or etherified derivatives, obtained in the above manner or also directly, by subsequent functional conversion, for example esterification or etherification, polysubstituted derivatives, especially mixed esters or ethers or ether esters can be produced. If during the hydrolysis, especially with alkaline agents, 9:11- or 11:12-oxido compounds have been produced by conversion from the corresponding 9:11- or 12:11-halogen hydrins, they can be reconverted into the desired 9:11- or 12:11-halogen hydrins by the action of hydrohalic acids, especially hydrofluoric or hydrochloric acid.

The products of the process are intended to be used as medicaments or as intermediate products for the manufacture thereof.

The following examples illustrate the invention:

*Example 1*

To a well developed four days old shaking culture of *Pleospora gaeumanni* in 500 cc. of 70% aqueous beer wort with 0.5 cc. of sperm oil, produced at 28° C. there is added under sterile conditions a solution of 125 mg. of aldosterone in 10 cc. of acetone. The suspension is shaken for a further four days at the same temperature. The mycelium is now separated and well washed with water and ethyl acetate. The combined clear solutions are extracted by shaking with ethyl acetate. The ethyl acetate solutions are washed with water, dried and evaporated under vacuum. The residue is dissolved in 80% methanol and extracted several times with petrol ether. The ethanol solutions are then evaporated under vacuum to complete dryness. A paper chromatogram of the residue (propylene glycol-toluene) exhibits together with a little aldosterone, the somewhat slower moving 14α-hydroxy-aldosterone. The whole residue is separated by means of a preparative paper chromatogram (propylene glycol-toluene). The zones corresponding to the 14α-hydroxy-aldosterone are cut out and extracted several times with 50% methanol. The methanol is then removed under vacuum and the remaining aqueous solution extracted several times with ethyl acetate and the combined ethyl acetate solutions washed with water, dried and evaporated under vacuum, whereby as residue pure 14α-hydroxy-aldosterone is obtained.

The incubation of the aldosterone can also be carried out in 500 cc. of a well developed aqueous culture of *Curvularia pallescens* which contains the following additions: 5 grams of cane sugar, 5 grams of Difcotryptone, 1 gram of sodium nitrate, 0.5 gram of secondary potassium orthophosphate, 0.25 gram of magnesium sulfate, 0.25 gram of potassium chloride, 5 mg. of ferrous sulfate-heptahydrate, 1.25 grams of calcium carbonate and 0.5 cc. of sperm oil. The working up takes place as above described.

The resulting 14α-hydroxy-aldosterone can be esterified as follows: 100 mg. are dissolved in 0.2 cc. of pyridine and 0.4 cc. of acetic anhydride. The solution is left to stand for 15 hours at 20° C. and then with addition of water evaporated first in a moderate vacuum and finally under high vacuum at 35° C. 14α-hydroxy-aldosterone-18:21-diacetate is obtained as residue.

*Example 2*

To a well developed four days old shaking culture of *Pleospora gaeumanni* in 500 cc. of 70% aqueous beer wort with 0.5 cc. of sperm oil, produced at 28° C., there is added under sterile conditions a solution of 125 mg. of 1-dehydro-aldosterone (produced according to application S.N. 563,437, filed February 6, 1956, now Patent No. 2,949,405) in 10 cc. of acetone. The suspension is shaken for a further four days at the same temperature. The reaction mixture is then worked up as described in Example 1 and the 1-dehydro-14α-hydroxy-aldosterone produced likewise isolated as described by means of a preparative paper chromatogram (propylene glycol-toluene) in which it is somewhat slower moving than 1-dehydro-aldosterone.

For esterification, the resulting 1-dehydro-14α-hydroxy-aldosterone is dissolved in 0.2 cc. of pyridine and 0.4 cc. of acetic anhydride and the solution allowed to stand for 15 hours at 20° C. and then evaporated first in a moderate vacuum and finally under high vacuum at 35° C. The residue is 1-dehydro-14α-hydroxy-aldosterone-18:21-diacetate.

*Example 3*

125 mg. of the (18→11β)-lactone of Δ⁴-3:20-dioxo-11β-hydroxy-pregnene-18-acid (prepared according to application S.N. 585,142, filed May 16, 1956, and now abandoned) are reacted as described in Examples 1 and 2 with a culture of *Pleospora gaeumanni*. The reaction product is likewise worked up as there described and the resulting (18→11β)-lactone of Δ⁴-3:20-dioxo-11β:14α-dihydroxy-pregnene-18-acid also isolated as described.

What is claimed is:
1. 14α-hydroxy-aldosterone.
2. The 18,21-diacetate of 14α-hydroxy-aldosterone.
3. 1-dehydro-14α-hydroxy-aldosterone.
4. The 18,21-diacetate of 14α-hydroxy-1-dehydroaldosterone.
5. The (18→11β)-lactone of Δ⁴-3,20-dioxo-11β,14α-dihydroxy-pregnene-18-oic-acid.
6. A member selected from the group consisting of a compound of the formula

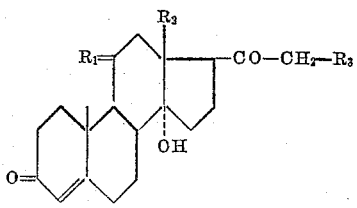

in which $R_1$ is a member selected from the group consisting of (1) two hydrogen atoms, (2) a free hydroxy group together with a hydrogen atom, (3) a hydroxy group lactonized with a 13-carboxy group together with a hydrogen atom, (4) a hydroxy group acetalized with a 13-aldehyde group together with a hydrogen atom and (5) an oxo group, $R_2$ is a member selected from the group consisting of hydroxymethyl group, an aldehyde group, an aldehyde group hemi-acetalized with an 11-hydroxy group and its derivatives derived from esterification with an organic acid having from 1 to 8 carbon atoms, said acid being a member selected from the group consisting of formic acid, acetic acid, chloracetic acids, trifluor-acetic acid, propionic acid, butyric acids, valeric acids, trimethyl acetic acid, diethyl acetic acid, caproic acids, oenanthic acids, caprylic acids, palmitic acids, crotonic acid, undecanic acid, undecylenic acid, oxalic acid, succinic acid, pimelic acid, maleic acid, lactic acid, carbamic acids, alkoxy-carboxylic acids, β-cyclopentylpropionic acid, hexahydrobenzoic acid, benzoic acid, phenylacetic acid, cylohexylacetic acid, phenylpropionic acids, trimethylgallic acid, phthalic acid, furane-2-carboxylic acid, isonicotinic acid, methane sulfonic acid, toluene sulfonic acid, sulfuric acids, hydrohalic acids and phosphoric acids, a carboxyl group and a carboxylic acid group lactonized with an 11-hydroxy group, and $R_3$ is a member selected from the group consisting of hydrogen, a hydroxy group, a hydroxy group esterified with an organic acid having from 1 to 8 carbon atoms, said acid being a member selected from the group consisting of formic acid, acetic acid, chloracetic acids, trifluor-acetic acid, propionic acid, butyric acids, valeric acids, trimethyl acetic acid, diethyl acetic acid, caproic acids, oenanthic acids, caprylic acids, palmitic acids, crotonic acid, undecanic acid, undecylenic acid, oxalic acid, succinic acid, pimelic acid, maleic acid, lactic acid, carbamic acids, alkoxy-carboxylic acids, β-cyclopentylpropionic acid, hexahydrobenzoic acid, benzoic acid, phenylacetic acid, cyclohexylacetic acid, phenylpropionic acids, trimethylgallic acid, phthalic acid, furane-2-carboxylic acid, isonicotinic acid, methane sulfonic acid, toluene sulfonic acid, sulfuric acids, hydrohalic acids and phosphoric acids, and a lower alkoxy group, and the 1:2-dehydro derivatives thereof.

References Cited in the file of this patent
UNITED STATES PATENTS

| | | |
|---|---|---|
| 2,555,704 | Ruzicka | June 5, 1951 |
| 2,649,401 | Haines | Aug. 18, 1953 |
| 2,649,402 | Murray | Aug. 18, 1953 |
| 2,662,089 | Murray | Dec. 8, 1953 |
| 2,670,358 | Murray | Feb. 23, 1954 |
| 2,673,866 | Murray | Mar. 30, 1954 |
| 2,773,885 | Laubach | Dec. 11, 1956 |
| 2,844,513 | Wettstein et al. | July 22, 1958 |
| 2,862,925 | Reichstein et al. | Dec. 2, 1958 |

OTHER REFERENCES

Chemical Society Annual Reports, 1954, pages 23–224.